United States Patent [19]

McKee

[11] 4,288,899
[45] Sep. 15, 1981

[54] DISC BRAKE PISTON DEPRESSING TOOL

[76] Inventor: Edward A. McKee, 104 Rock Levee Rd., Scott City, Mo. 63780

[21] Appl. No.: 78,361

[22] Filed: Sep. 24, 1979

[51] Int. Cl.³ ............................................. B23P 19/04
[52] U.S. Cl. ..................................................... 29/256
[58] Field of Search .......................... 29/256, 258–260, 29/263–264, 266, 233, 239; 254/100, 101

[56] References Cited

U.S. PATENT DOCUMENTS

| 714,037 | 11/1902 | Ruckgauer | 254/100 |
| 3,762,021 | 10/1973 | Racin | 29/263 |
| 3,835,522 | 9/1974 | Ward | 29/239 |
| 3,902,236 | 9/1975 | Deem | 29/256 |

Primary Examiner—Robert C. Watson
Attorney, Agent, or Firm—Neil F. Markva

[57] ABSTRACT

A tool is used to move the piston into the cylinder bore of a disc brake caliper housing having a support bracket with an opening disposed opposite the piston. The tool comprises a threaded shaft having a piston engaging member rotatably connected at one end of the shaft. A shaft rotating member is rigidly secured to the other end of the shaft. A brace member threadingly engages the shaft member at a location intermediate the two ends thereof. The brace member has a structural configuration to abut the inside surface of the support bracket of the caliper housing. The brace member also is effective to span the opening to position the shaft member within the opening so that the piston engaging member can be moved directly toward the piston. The piston engaging member is effective to exert a pressure against the opposing edges of the piston when the brace member abuts the inside surface of the support bracket.

18 Claims, 9 Drawing Figures

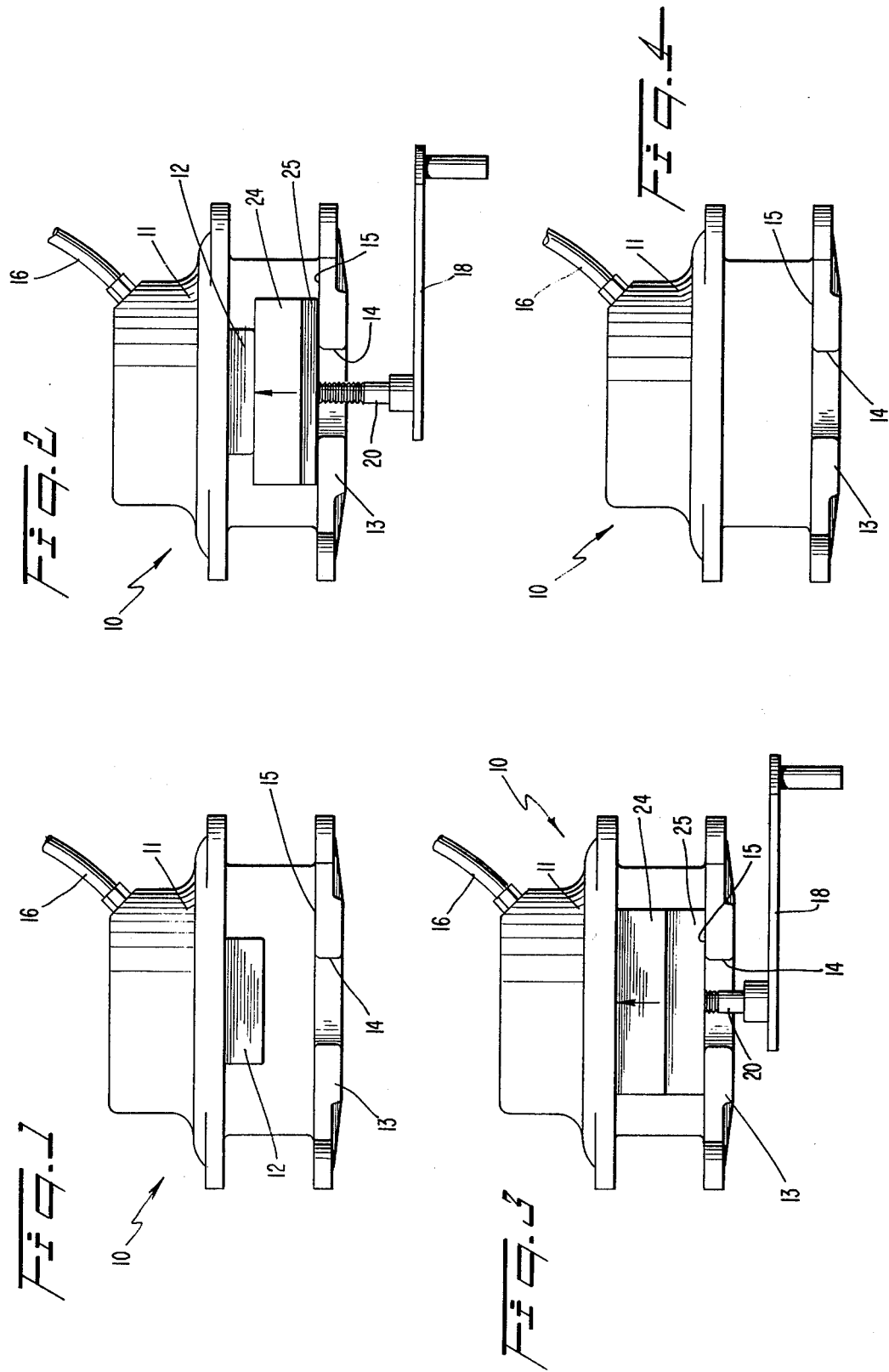

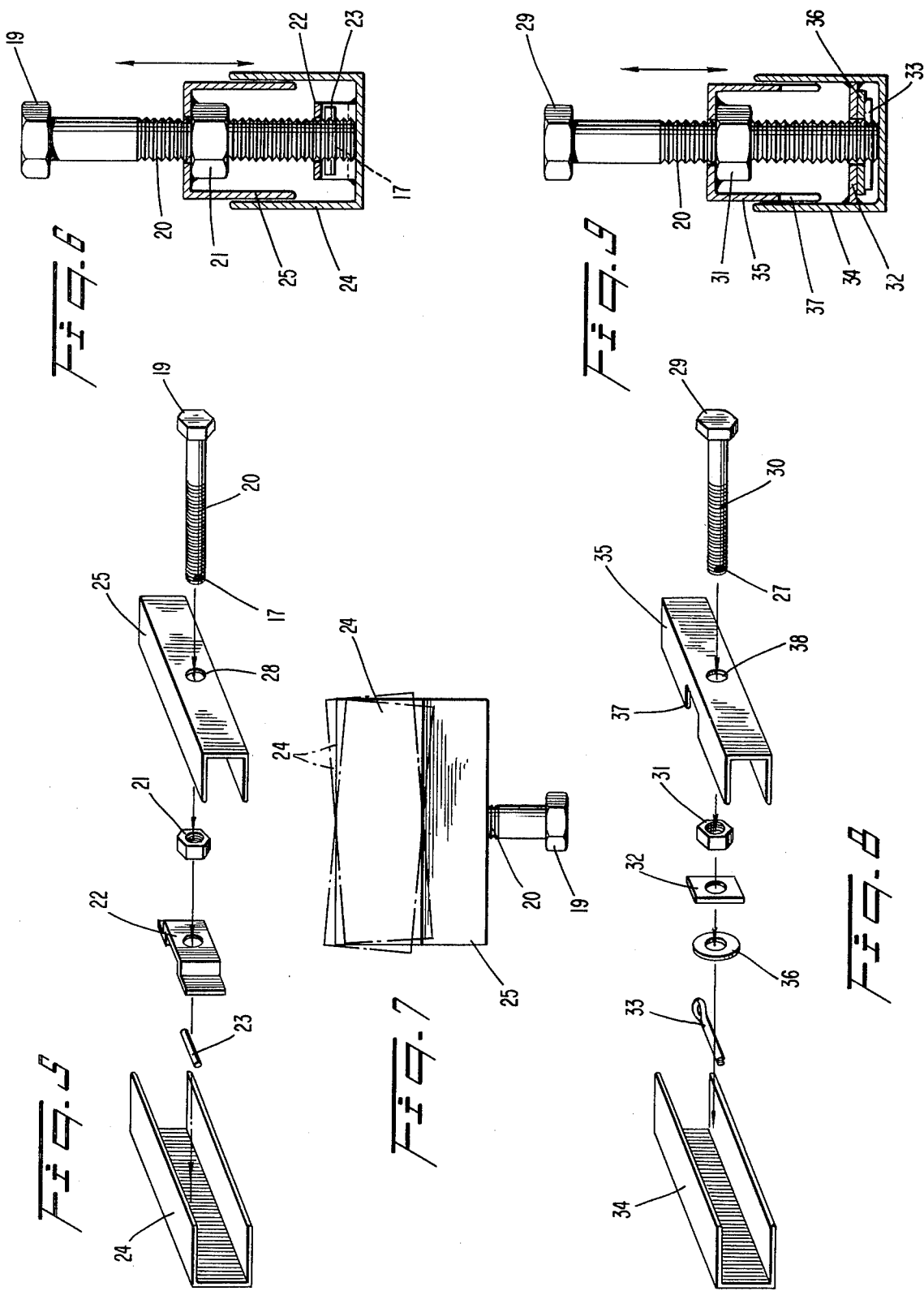

DISC BRAKE PISTON DEPRESSING TOOL

FIELD OF THE INVENTION

This invention relates generally to a tool useful in changing brake pads on a disc brake caliper assembly. More particularly, the invention relates to a device for moving the piston into a retracted position into the cylinder of a disc brake caliper housing to effect the changing of disc brake pads.

BACKGROUND OF THE INVENTION

The changing of brake pads on a disc brake caliper assembly is generally accomplished through the use of a C-clamp. Mechanics find the use of such a C-clamp to be somewhat difficult because of the lack of control associated with it. Such a clamp tends to wander from the center of the piston and could cause damage to the cylinder if excessive pressure is applied. Thus, the continuing wandering or walking of the C-clamp while trying to depress the piston into the cylinder requires many resettings to perform the otherwise simple operation of depressing the piston to its retracted position within a piston cylinder. In other words, much time and potential damage is associated with the present state of the art.

Conventionally, the pistons of the disc brake assemblies have a closed end adjacent the closed end of the cylindrical bore and an open end adjacent the end operating in conjunction with the disc brake pad. The piston is axially moved outwardly by hydraulic fluid to push a brake shoe having a brake lining against the disc of a brake disposed between the outer end of the piston and the support bracket of the disc brake caliper housing.

It is well known that these pistons tend to stick because of dirt and/or corrosion being formed or disposed between the piston and the inside wall of the cylinder bore. As the brake pads wear, the pistons project outwardly from the cylinder bore. Because the piston is hollow and axially short as compared to its diameter, it is difficult to move the piston into the bore of the caliper housing either by hand or through the use of the C-clamp. That is, it tilts or cocks easily about its axis to bind within the cylindrical bore.

It is known to provide a piston puller which fits inside the open end of the piston and thereby enables the piston to be moved into or out of the cylindrical bore. Such devices are disclosed in the U.S. Pat. Nos. 3,786,551 and 4,009,515. In each of these instances, however, the device requires a particular type of gripping member which must be placed inside the hollow piston and thereafter activated through a rotation of a part causing the gripping member to expand and thus come into contact with the inside surface of the cup. Once this is done, the piston cup may then be moved into or out of the cylinder bore. In each of these prior art mechanisms the threaded shaft is maintained in a nonrotating condition while nuts or tightening members are turned to effect the desired inward or outward motion of the piston with respect to the cylinder bore.

SUMMARY OF THE INVENTION

The primary object of this invention is to provide a simple piston depressing tool for a disc brake caliper assembly which will exert an even pressure on the edges of the piston while it is being pressed into the cylinder bore as a step in the operation of changing the disc brake pads on the assembly.

Another object of the invention is to provide a tool having a threaded shaft which is rotatable to effect the desired movement of the piston into the cylinder bore of a disc brake caliper housing through the use of a single tool being operated at the outer end of the shaft member.

The tool of this invention comprises a threaded shaft means having a piston engaging means rotatably connected at one end thereof and a shaft rotating means rigidly secured to the other end thereof. Brace means threadingly engage the shaft means at a location intermediate the two ends of the shaft means. The brace means has a structural configuration to abut the inside surface of the support bracket and is effective to span the opening in the support bracket to position the shaft means within the opening. The brace means thus is movably disposed with respect to the two ends of the shaft means as the shaft is rotated within the threaded brace means. The piston engaging means is effective to exert pressure against opposing edges of the piston when the shaft rotating means is rotated while the brace means abuts the inside surface of the support bracket on the disc brake caliper assembly.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is an elevational view of a disc brake caliper assembly showing the piston in an extended position with respect to the cylinder bore therein;

FIG. 2 shows the disc brake caliper of FIG. 1 with the disposition of a tool made in accordance with this invention at an intermediate point within the piston retracting operation;

FIG. 3 is an elevational view showing the tool of the invention in an extended position with the piston of the caliper assembly fully retracted;

FIG. 4 is an elevational view of the caliper assembly shown in FIG. 3 at the end of the retracting or piston depressing operation;

FIG. 5 is an exploded view of a first embodiment of a tool made in accordance with this invention;

FIG. 6 is an end elevational view of the embodiment of FIG. 5;

FIG. 7 is a side elevational view of the device of FIG. 5;

FIG. 8 is an exploded view of another embodiment made in accordance with this invention; and FIG. 9 is an end elevational view of the embodiment shown in FIG. 8.

DETAILED DESCRIPTION

Referring to the drawings, the disc brake caliper assembly, generally designated 10, includes a housing 11 having a support bracket 13 with two sections spaced with respect to each other, as shown, to define an opening 14 disposed opposite to the piston 12. The hydraulic fluid line 16 directs hydraulic fluid into and out of the assembly 10 for the purpose of reciprocally moving the piston 12 into and out of the cylindrical bore of the caliper housing 11. The structure of this particular brake assembly is conventional.

The embodiments as shown in FIGS. 5 and 8 operate to effect substantially the same type of movement with the handle 18 being used to rotate the shaft member 20 or 30 thereby depressing or pushing the piston into a retracted position within the cylinder bore of the caliper housing 11.

The two embodiments differ with respect to the manner in which the piston engaging means includes a piston contacting surface and is rotatably connected, as shown, at a fixed location at one end of the shaft means. In FIG. 5, the threaded shaft 20 has a nut head 19 rigidly secured to one end thereof. The piston engaging means includes a bar of material having two ends and comprising a U-shaped channel member 24 to which a retaining member 22 is fixedly secured, such as by welding. The brace member 25 comprises a bar of material which includes an opening 28 around which the nut 21 is fixedly attached as by welding. The brace member 25 thus threadingly engages shaft 20 at a location intermediate the two ends thereof and is thus movable with respect to the piston engaging means.

Shaft member 20 extends through opening 28 and threadingly engages nut member 21 having threads so at least a portion of the bore through the brace member 25 has threads and engages the threaded shaft 20. It is clear, however, that the brace member 25 might include a threaded opening 28 thereby eliminating the need for the nut member 21.

The retaining member 22 includes an opening through which the other end of threaded shaft 20 extends. The bore 17 is drilled transversely through the longitudinal axis of shaft 20 and receives the pin 23 to thereby rotatably connect the threaded shaft between the two ends of the piston engaging member 24.

As is evident in the drawings, piston engaging member 24 has a piston contacting surface effective to exert pressure against opposing edges of piston 12. As shown, brace member 25 has a length effective to span opening 14 to position shaft 20 within opening 14 between the spaced sections of support bracket 13. The connected end of shaft 20 is rotatably located on the side opposite said piston contacting surface of the piston engaging member 24. As shown, the connected end of shaft 20 is located at the geometric center or, in this case, the center of mass of the piston engaging bar member 24.

The assembled tool is shown in FIG. 6. By rotating the shaft 20 with the handle 18, the piston engaging member 24 moves with respect to the brace member 25 which is to be disposed against the inner surface 15 of the support bracket 13 in disc brake assembly 10. The outer end of shaft 20 is in contact with the inside surface of the piston engaging member 24. The manner in which the piston engaging member is rotatably connected to shaft 20 causes the member 24 to be tiltable through a delimited angle with respect to a direction normal to the longitudinal axis of the threaded shaft 20. The manner in which the piston engaging member 24 moves is shown in the elevational view of FIG. 7.

The embodiment of FIG. 8 differs from the earlier embodiment with respect to the manner in which the piston engaging member 34 is rotatably connected to the shaft 30. The retaining member 32 is welded to the inside surface of the legs of the channel member 34 as shown in FIG. 9. Threaded shaft 30 includes a rigidly attached nut 29 at one end thereof. The other end includes a transverse bore 27 which receives the cotter pin 33 after shaft 30 extends through hole 38, nut 31, retaining member 32 and washer 36. The cut-out 37 in the brace member 35 is large enough to accommodate the retaining member 32 which is welded onto the legs of piston engaging member 34.

The piston engaging member 34 has a first U-shaped channel section with legs that are interfitted with the legs of the brace member 35 formed of a second U-shaped channel section. The legs of each of the channel members 34 and 35 constitute first and second extension means which project toward each other and are effective to interact with each other to stabilize the piston engaging member 34 and the brace member 35 with respect to each other when the shaft 30 is rotated once the base of brace member 35 is disposed adjacent the inner surface 15 of support bracket 13 on assembly 10. Thus, the legs of the U-shaped channel sections of the two embodiments constitute guide means effective to maintain the disposition of the brace means and the piston engaging means with respect to each other. The tiltable function of the brace member in each embodiment enables the tool to have its substantially flat surface extend a lateral distance sufficient to contact opposing edges of the piston being moved and exert a substantially even pressure there across during the entire retracting or depressing operation. Thus, the tool stays in perfect alignment with the piston through the entire depressing procedure.

Guide means may be constructed in other ways to achieve the stabilization of the working members, namely, the piston engaging member and brace member with respect to each other. For example, pegs or pin members may be rigidly connected to either of the working members while projecting through corresponding openings in the other working member.

While the disc brake piston depressing tool has been shown and described in detail, it is obvious that this invention is not to be considered as being limited to the exact form disclosed, and that changes in detail and construction may be made therein within the scope of the invention, without departing from the spirit thereof.

I claim:

1. A tool for moving the piston into the cylinder bore of a disc brake caliper housing having a support bracket with two sections spaced with respect to each other to define an opening disposed opposite to said piston, said tool comprising:

(a) a threaded shaft means having a piston engaging means rotatably connected at a fixed location at one end of the shaft means and a shaft rotating means rigidly secured to the other end thereof, and (b) brace means threadingly engage said shaft means to be movable with respect to the piston engaging means at a location intermediate the two ends of the shaft means, (c) said brace means including a first bar of material having a structural configuration to abut the inside surface of the support bracket sections and a length effective to span the opening to position said shaft means within said opening beween said sections, (d) said piston engaging means including a second bar of material having two ends and a piston contacting surface means therebetween, said piston contacting surface means being effective to exert pressure against opposing edges of the piston when the shaft rotating means is rotated while the brace means abuts the inside surface of the support bracket, (e) said one end of the shaft means being rotatably located on the side opposite said piston contacting surface means of the second bar of material at the geometric center of said second bar of material.

2. A tool as defined in claim 1 wherein
the piston contacting surface means includes a substantially flat surface which extends a lateral distance sufficient to contact opposing edges of said piston.

3. A tool as defined in claim 1 wherein
said first bar of material has a bore through which the shaft means extends,
at least a portion of said bore has threads which engage said threaded shaft means.

4. A tool as defined in claim 3 wherein
said portion having threads includes a nut member secured to said bar.

5. A tool as defined in claim 3 wherein
said portion having threads includes a threaded bore extending through said bar of material.

6. A tool for moving the piston into the cylinder bore of a disc brake caliper housing having a support bracket with two sections spaced with respect to each other to define an opening disposed opposite to said piston, said tool comprising:
(a) a threaded shaft means having a piston engaging means rotatably connected at one end thereof and a shaft rotating means rigidly secured to the other end thereof, and
(b) brace means threadingly engage said shaft means at a location intermediate the two ends of the shaft means,
(c) said brace means having a structural configuration to abut the inside surface of the support bracket and effective to span the opening to position said shaft means within said opening,
(d) said piston engaging means being effective to exert pressure against opposing edges of the piston when the shaft rotating means is rotated while the brace means abuts the inside surface of the support bracket,
(e) said piston engaging means is tiltable through a delimited angle with respect to a direction normal to the longitudinal axis of the threaded shaft means.

7. A tool as defined in claim 1 wherein
said piston engaging means has a shaft means connecting surface which includes retaining means for maintaining said shaft means in rotating contact with said piston engaging means.

8. A tool as defined in claim 7 wherein
said one end of the threaded shaft means includes a transverse bore which receives a pin means to maintain the end of the shaft means in position with respect to the retaining means.

9. A tool for moving the piston into the cylinder bore of a disc brake caliper housing having a support bracket with two sections spaced with respect to each other to define an opening disposed opposite to said piston, said tool comprising:
(a) a threaded shaft means having a piston engaging means rotatably connected at one end thereof and a shaft rotating means rigidly secured to the other end thereof, and
(b) brace means threadingly engage said shaft means at a location intermediate the two ends of the shaft means,
(c) said brace means having a structural configuration to abut the inside surface of the support bracket and effective to span the opening to position said shaft means within said opening,
(d) said piston engaging means including a piston contacting surface effective to exert pressure against opposing edges of the piston when the shaft rotating means is rotated while the brace means abuts the inside surface of the support bracket,
(e) said piston engaging means including retaining means for maintaining the shaft means in rotating contact with the piston engaging means which is tiltable through a delimited angle about a contact point between the outer end of the shaft means and the piston engaging means.

10. A tool as defined in claim 1 wherein
guide means are effective to maintain the disposition of the brace means and piston engaging means with respect to each other.

11. A tool as defined in claim 1 wherein
said piston engaging means includes a first extension means projecting toward said brace means and
said brace means includes second extension means projecting toward said piston engaging means
said first and second extension means being effective to interact with each other to stabilize the piston engaging means and brace means with respect to each other.

12. A tool for moving the piston into the cylinder bore of a disc brake caliper housing having a support bracket with two sections spaced with respect to each other to define an opening disposed opposite to said piston, said tool comprising:
(a) a threaded shaft means having a piston engaging means rotatably connected at one end thereof and a shaft rotating means rigidly secured to the other end thereof, and
(b) brace means threadingly engage said shaft means at a location intermediate the two ends of the shaft means,
(c) said brace means having a structural configuration to abut the inside surface of the support bracket and effective to span the opening to position said shaft means within said opening,
(d) said piston engaging means being effective to exert pressure against opposing edges of the piston when the shaft rotating means is rotated while the brace means abuts the inside surface of the support bracket,
(e) said piston engaging means includes a first U-shaped channel section and
(f) said brace means includes a second U-shaped channel section,
(g) the legs of said first and second channel sections being interfitted with respect to each other.

13. A tool as defined in claim 6 wherein
the piston contacting surface means includes a substantially flat surface which extends a lateral distance sufficient to contact opposing edges of said piston.

14. A tool as defined in claim 6 wherein
said brace means includes a bar of material having a bore through which the shaft means extends,
at least a portion of said bore has threads which engage said threaded shaft means.

15. A tool as defined in claim 14 wherein
said portion having threads includes a nut member secured to said bar.

16. A tool as defined in claim 14 wherein
said portion having threads includes a threaded bore extending through said bar of material.

17. A tool as defined in claim 6 wherein said piston engaging means includes retaining means for maintaining said shaft means in rotating contact with said piston engaging means, said one end of the threaded shaft means includes a transverse bore which receives a pin means to maintain the end of the shaft means in position with respect to the retaining means.

18. A tool as defined in claim 6 wherein guide means are effective to maintain the disposition of the brace means and piston engaging means with respect to each other.

* * * * *